Aug. 28, 1923.
L. NORDSTRÖM
1,466,547
LUMBER TRANSPORTING DEVICE
Filed July 26, 1922
2 Sheets-Sheet 1
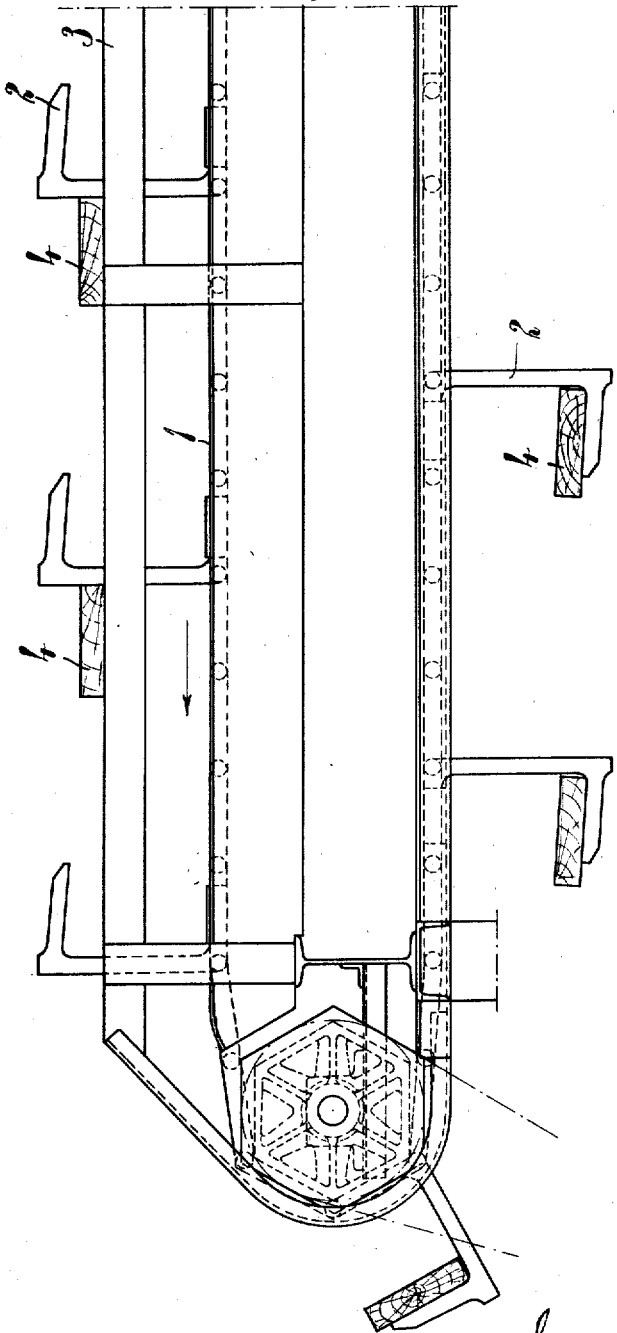

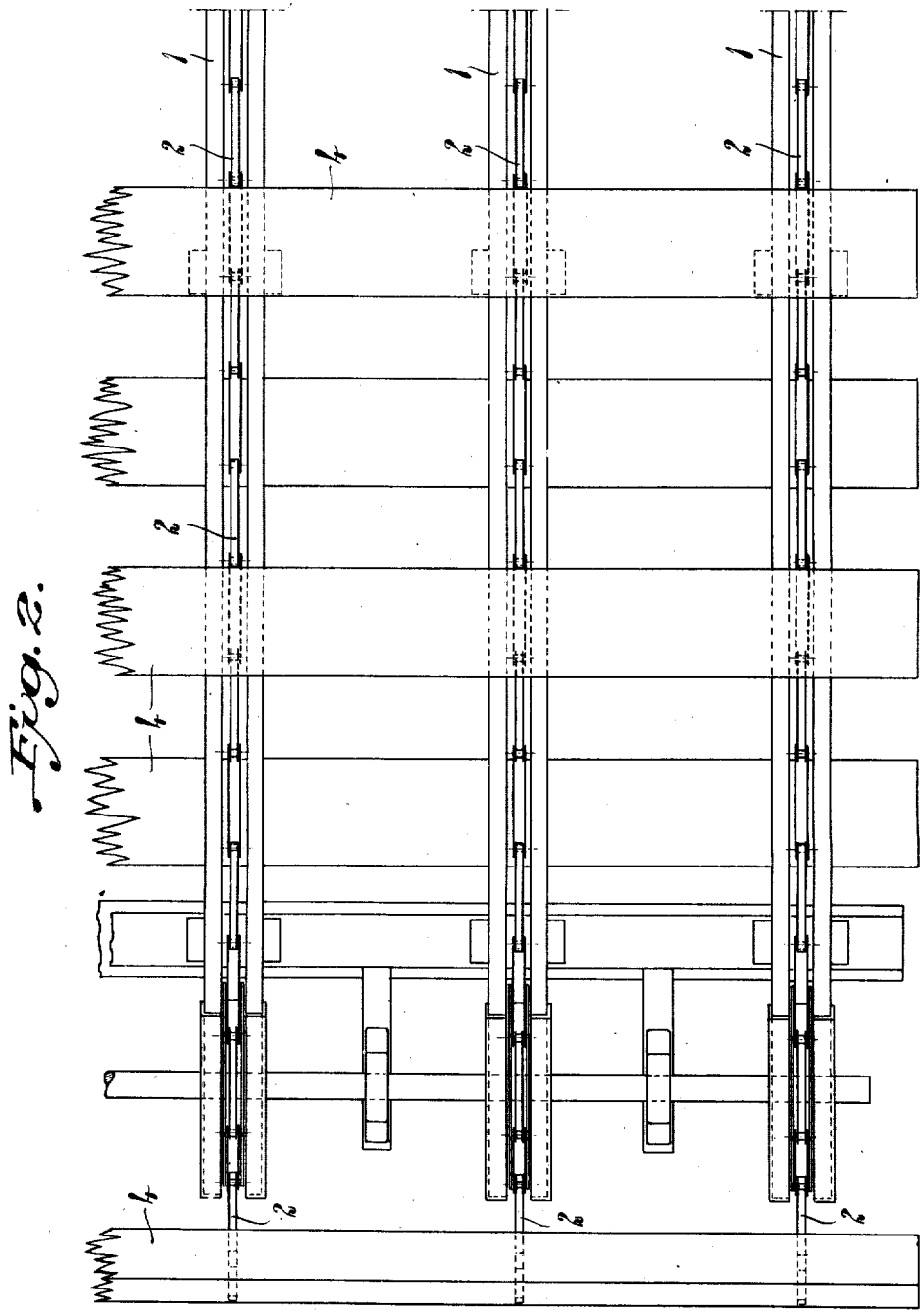

Patented Aug. 28, 1923.

1,466,547

UNITED STATES PATENT OFFICE.

LEON NORDSTRÖM, OF STOCKHOLM, SWEDEN.

LUMBER-TRANSPORTING DEVICE.

Application filed July 26, 1922. Serial No. 577,674.

*To all whom it may concern:*

Be it known that I, LEON NORDSTRÖM, a citizen of the Kingdom of Sweden, residing at Stockholm, Sweden, have invented new and useful Improvements in Lumber-Transporting Devices, of which the following is a specification.

The present invention relates to an improvement in such transporting devices for lumber or the like in which the lumber is fed by carriers on two or more endless chains arranged side by side. According to the invention the said carriers are formed as hooks the one part of which is substantially parallel with the path of the chains and of such length that the lumber can rest thereon when the hooks are turned downwards while the hooks when turned upwards reach a distance above the upper surface of a transporting table arranged in the usual manner above the chains. Both the upper and the lower part of the chains thus can serve to move the lumber, this being of great advantage in such lumber sorting devices in which the unsorted lumber is fed to the transporting device at different places and then transported to the one end thereof for being sorted and then carried to the various collecting places.

In the accompanying drawing I have shown one embodiment of my invention. Figure 1 shows a side view of a transporting device of the kind set forth above and Fig. 2 shows a plan view thereof.

As is evident from the drawing some of the links of the transporting chain 1 are formed as hooks 2 which in the upper portion of the chain reach a distance above a usual substantially horizontal transporting table 3 to which the lumber is fed in any well known manner. The lumber 4 is moved on the table by the hooks 2 which serve as carriers to the one end of the transporting device where it is pushed off onto a well known sorting table (not shown) on which it is sorted in the usual manner, and thereupon placed on the hooks of the lower portion of the chain in order to be carried to the various collecting places.

Having now described my invention what I claim is.

In a transporting device for lumber the combination of a substantially horizontal transporting table, endless chains arranged side by side below said transporting table, and carrier hooks attached to said chains, the hooks in the upper portion of each chain reaching a distance above the said transporting table, a portion of each hook being substantially parallel with the path of the chains and of such length that the lumber can rest thereon when the hooks are turned downwards, substantially as and for the purpose set forth.

In testimony whereof I have signed my name.

LEON NORDSTRÖM.